United States Patent [19]

Soushin et al.

[11] Patent Number: 5,083,067
[45] Date of Patent: Jan. 21, 1992

[54] DRIVING CIRCUIT FOR BRUSHLESS MOTOR

[75] Inventors: Koji Soushin; Hiroaki Koshin; Shinichi Okamoto; Toshiharu Ohashi, all of Kadoma, Japan

[73] Assignee: Matsushita Electric Works, Ltd., Japan

[21] Appl. No.: 564,164

[22] Filed: Aug. 8, 1990

[30] Foreign Application Priority Data

Aug. 12, 1989 [JP] Japan .................. 1-208322

[51] Int. Cl.$^5$ .................. H02P 6/02
[52] U.S. Cl. .................. 318/254
[58] Field of Search .................. 318/138, 254, 439

[56] References Cited

U.S. PATENT DOCUMENTS

| | | | |
|---|---|---|---|
| 4,459,520 | 7/1984 | Wada | 318/254 |
| 4,712,050 | 12/1987 | Nagasawa et al. | 318/254 |
| 4,740,734 | 4/1988 | Takeuchi et al. | 318/254 |
| 4,760,315 | 7/1988 | Nanae et al. | 318/254 |
| 4,760,317 | 7/1988 | Hetzel et al. | 318/254 |

Primary Examiner—Bentsu Ro
Attorney, Agent, or Firm—Leydig, Voit & Mayer

[57] ABSTRACT

A driving circuit for brushless motor has a measure for damping the motor with both upper side and lower side power MOSFET's of half-bridges in pairs which corresponding to three phase coils in bipolar system rendered to be in reverse operating state by turning off a single control power source. The circuit is thereby made realizable an effective motor damping with a simpler circuit structure.

4 Claims, 11 Drawing Sheets

(a) UPPER FET GATE VOLTAGE (b) CHARG. CURRENT OF CONDENSER

(a) UPPER FET GATE VOLTAGE

(b) CONDENSER CURRENT OF FLOATING COURCE 50 mA/div

DRIVING CIRCUIT FOR BRUSHLESS MOTOR

BACKGROUND OF THE INVENTION

This invention relates to a driving circuit for brushless motors and, more particularly, to a circuit for driving a brushless motor of the three phase bipolar type.

The brushless motors of the kind referred to can be made highly durable and are effectively utilizable in rechargeable motor-driven tools, manufacturing robots and so on.

DESCRIPTION OF RELATED ART

In achieving durability in recent years, brushless motors the only weary portion of which is substantially rotor shaft bearing have been widely utilized. In this case, it has been a demand that a driving circuit which can effectively the brushless motor control from starting to damping of the brushless motor be provided.

In U.S. Pat. No. 4,051,417 to M. Fujinawa et al, there has been suggested a driving circuit for three-phase brushless motor, the circuit being adapted to control rotating speed of the motor by providing a rotor position signal to a semiconductor switch. Further driving circuits for controlling the rotating speed of the brushless motor have been disclosed in U.S. Pat. Nos. 4,358,720 to F. Abe, 4,544,868 to V. B. Murty, 4,651,067 to T. Ito et al, 4,780,656 to R. M. Mitchell, 4,888,533 to M. Gotoh et al and so on. According to these patents, however, there has not been still disclosed any arrangement for quick damping while the rotation of the brushless motor itself can be effectively controlled by means of an operation of semiconductor switch. Furthermore there has been left unsolved the problem of effectively realizing quick damping.

In Japanese Patent Application Laid-Open Publication No. 1-268483 of M. Mizuki et al or No. 1-298982 of Y. Imai, on the other hand, there has been disclosed an arrangement for damping the motor by applying a reverse 10 rotational torque to the rotor, but they still fail to suggest any technical idea of effectively realizing the quick damping with a simpler driving circuit.

In the brushless motors of the kind referred to, it is preferable to employ a damping means of a coil short-circuiting system. When, in this case, a damping mode is prepared by means of, for example, a logic circuit, it becomes necessary to provide a power source for each of semiconductor switches corresponding to the three-phase coils this causes a problem in that the driving circuit is rendered extremely complicated.

SUMMARY OF THE INVENTION

A primary object of the present invention is, therefore, to provide a driving circuit for brushless motors, the circuit effectively realizing quick damping in a simpler circuit arrangement with the damping means of the coil short-circuiting system and the semiconductor switches corresponding to the three phase coils employed and with the controlling power source for the entire semiconductor switches reduced to be single.

According to the present invention, the above object can be realized by a driving circuit for brushless motor, wherein a train of predetermined signals required for the driving circuit of three-phase bipolar type is prepared by a distributor circuit to which positional signals mutually of electric $2\pi/3$ phase relationship and generated at a position detector for the brushless motor are provided as inputs. Lower side power MOSFET's of half-bridges, in pairs, are driven at their gate by outputs of the distributor circuit through a first group of transistor bridges and upper side power MOSFET's of the half-bridges, in pairs, are driven at their gate by outputs of the distributor circuit with a floating power source, the ground of which is separated by a resistor and capacitor made as own power source and through a second group of transistor bridges, characterized in that means is provided for damping the motor by rendering the upper side power MOSFET's and lower side power MOSFET's corresponding to three-phase bipolar coils to be in mutually reverse operating state by turning off a single control power source.

Other objects and advantages of the present invention shall be made clear in the following description of the invention detailed with reference to preferred embodiments of the present invention shown in accompanying drawings.

BRIEF DESCRIPTION OF THE DRAWINGS

FIG. 1, including FIGS. 1a and 1b, shows in a circuit diagram an embodiment of the driving circuit for brushless motors according to the present invention;

FIG. 4, including FIGS. 4a and 4b, is a circuit diagram showing another embodiment of the present invention;

FIG. 5, including FIGS. 5a and 5b, is a circuit diagram showing still another 10 embodiment of the present invention;

FIG. 8, including FIGS. 8a and 8b, is a circuit diagram showing a further embodiment of the present invention.

While the present invention shall now be explained with reference to the various embodiments shown in the drawings, it should be appreciated that the intention is not to limit the invention to such embodiments but rather to include all alterations, modifications and equivalent arrangements possible within the scope of appended claims.

DETAILED DESCRIPTION OF THE PREFERRED EMBODIMENTS

Figures 1, 1A:
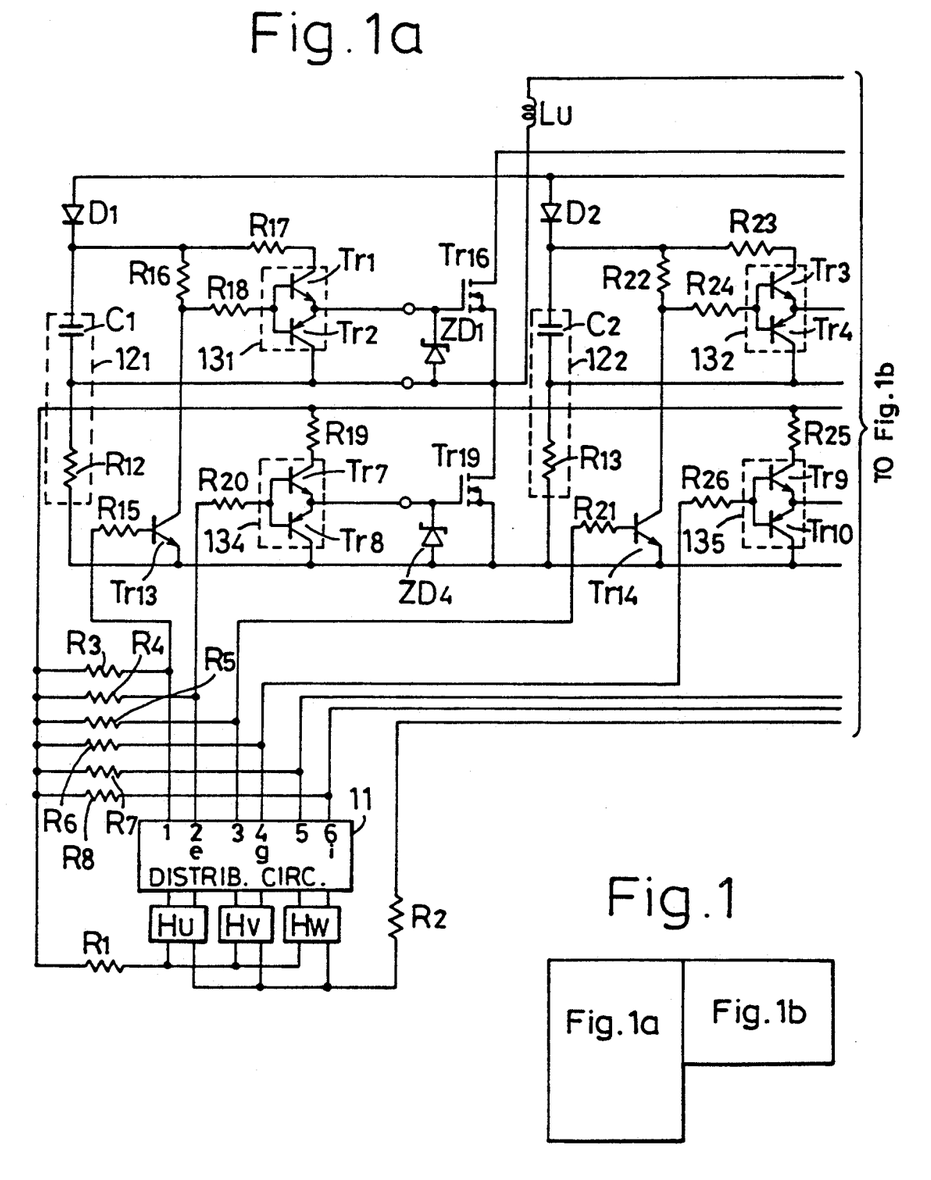
Figure 1B:
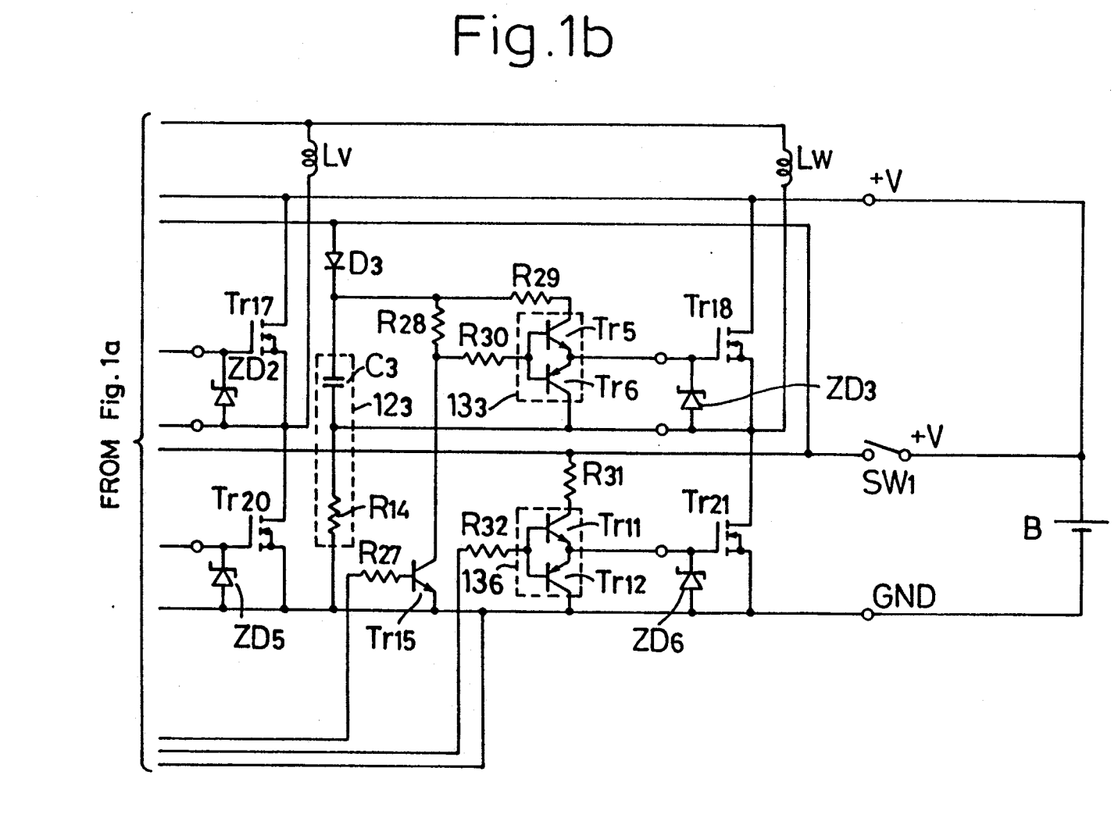
Figure 2:
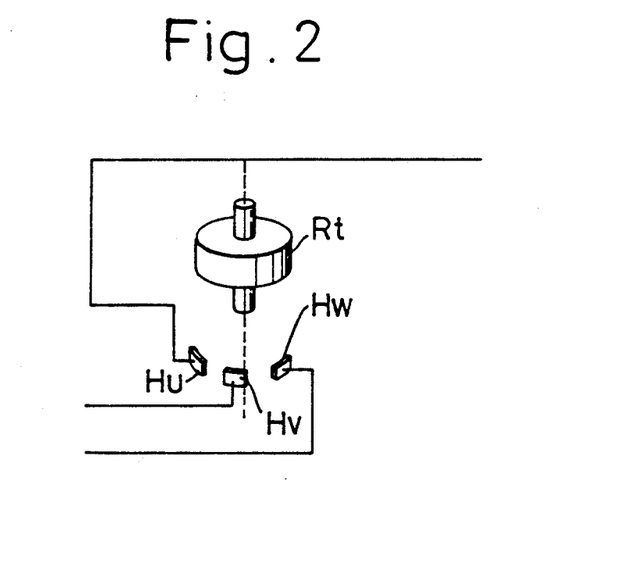
FIG. 2 is an explanatory view of the brushless motor to which the driving circuit of FIG. 1 is applied.
Figure 3:
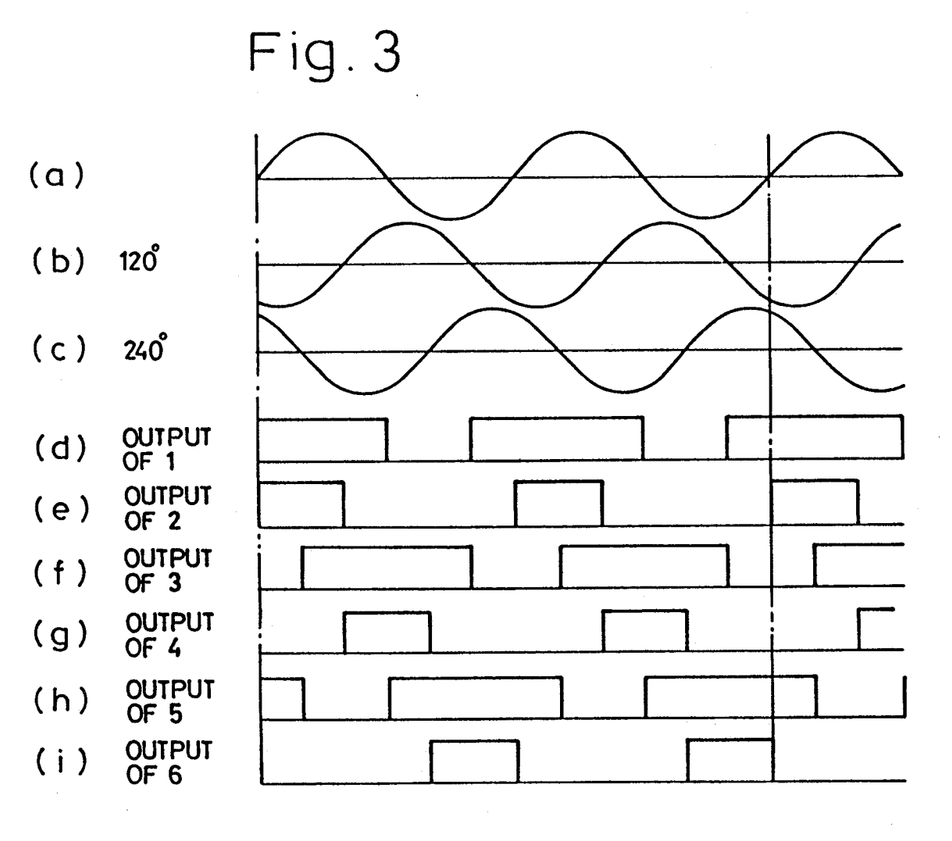
FIG. 3 is wave-form diagrams for showing the operation at respective parts of the driving circuit of FIG. 1.

Referring here to FIG. 1, there is shown an embodiment of the driving circuit for brushless motors according to the present invention, in which a distributor circuit 11 are connected to three Hall-effect elements $H_U$, $H_V$ and $H_W$. The Hall-effect elements $H_U$, $H_V$ and $H_W$ are disposed at intervals of a mechanical angle of 60° with respect to the rotary axis of a rotor Rt of a brushless motor as shown in FIG. 2, so as to provide output signals responsive to magnetic flux density of a magnetic pole. The Hall-effect elements $H_U$, $H_V$ and $H_W$ can also be positioned with respect to a position-detection magnet of the rotor Rt having permanent magnets, four magnetized poles (two pairs of NS poles) at intervals of a mechanical angle 90°, to which the elements are opposed through a gap. As shown in FIGS. 3(a) to 3(c), these output signals form sinusoidal voltage wave-forms mutually deviated in phase by $2\pi/3$. These signals are derived, through the distributor circuit 11 which prepares required signals for the driving circuit of the brushless motor. A train of output signals as shown in FIGS. 3(d) through 3(i) for driving respective power MOSFET's Tr16 to Tr21, the first three and latter three of which are respectively arranged on upper side and lower side in FIG. 1 to be in three pairs respectively connected to each of coils $L_U$, $L_V$ and $L_W$ of three phase bipolar. The lower side power MOSFET's Tr19 to Tr21 of half-bridges in the pairs are driven at their gate by three of such output signals as in FIGS. 3(e), 3(g) and 3(i) among the six output signals from the distributor circuit 11, through transistor bridges $13_4$ to $13_6$ respectively of a combination of NPN and PNP transistors. When these three output signals (e), (g) and (i) of FIG. 3 from the distributor circuit 11 are at H level, outputs of the transistor bridges $13_4$ to $13_6$ are also at H level, and the lower side power MOSFET's Tr19 to Tr21 of half-bridges in pairs are thereby turned ON whereas, when the output signals (e), (g) and (i) are at L level, the lower side power MOSFET's Tr19 to Tr21 are turned OFF. The transistor bridges $13_4$ to $13_6$ respectively comprise a combination of each of NPN transistors Tr7, Tr9 and Tr11 with each of PNP transistors Tr8, Tr10 and Tr12.

Remaining output signals as in FIGS. 3(d), 3(f) and 3(h) of the distributor circuit 11 are provided to drive the gate of the upper side power MOSFET's Tr16 to Tr18 of the half-bridge in the pairs through transistors Tr13 to Tr15, floating power sources $12_1$ to $12_3$ and transistor bridges $13_1$ to $13_3$ respectively of a combination of NPN and PNP transistors. In this case, the upper side power MOSFET's Tr16 to Tr18 are connected at the source to the drain of the respective lower side power MOSFET's Tr19 to Tr21, so that the potential of the upper side power MOSFET Tr16 to Tr18 with respect to the ground level as a reference will vary in accordance with the ON and OFF operation of the lower side power MOSFET's Tr19 to Tr21. In this respect, the power MOSFET is normally not to operate unless a predetermined voltage is applied across its gate and drain electrodes so that different power sources are required to the upper side and lower side power MOSFET's, and the floating power sources $12_1$ to $12_3$ are employed here. These floating power sources $12_1$ to $12_3$ comprise respectively each of charge accumulating capacitors C1 to C3 and charging resistors R12 to R14. The capacitors C1 to C3 are connected respectively in series with each of reverse flow preventing diodes D1 to D3 and the upper side power MOSFET's Tr16 to Tr18 are driven at their gate by the charge accumulated in the capacitors C1 to C3 which are separating by the resistors R12 to R14 from a ground terminal GND of the driving circuit. It will be appreciated here that a control system is formed by the foregoing distributor circuit 11, floating power sources $12_1$ to $12_3$ and transistor bridges $13_1$ to $13_6$. Furthermore, the brushless motor is subjected to a quick damping force at a time when the upper side three power MOSFET's Tr16 to Tr18 and the lower side three power MOSFET's Tr19 to Tr21 of the paired half-bridges in the control system are made to perform simultaneously mutually reverse operation, that is, one side transistors are turned ON but the other side transistors are turned OFF.

According to one of the features of the present embodiment, there is provided a single control switch for activating a power source for supplying a power to the driving circuit or, in particular, to the control system. In the present instance, an interruption of power from a battery B as the control power source to the circuit with the control switch SW1 turned OFF causes the gate voltage of the lower side power MOSFET's Tr19 to Tr21 to disappear first and these transistors are all turned OFF. Next, the transistors Tr13 to Tr15 for a level conversion between the side of the floating power sources $12_1$ to $12_3$ for driving the upper side power MOSFET's Tr1 to Tr18 and the distributor circuit 11 are turned OFF due to the loss of their base current. Three pairs of totem pole transistors Tr1 and Tr2, Tr3 and Tr4 and Tr5 and Tr6, for driving the gates of the upper side power MOSFET's Tr16 to Tr18 are connected at their respectively bases with a corresponding one of the floating power sources $12_1$ to $12_3$. The capacitors C1 to C3 in the three floating power sources 121 to 123 are maintained in a state in which the source voltage is kept applied, without discharging their accumulated charge even when the power supply from the battery B is interrupted. As a result the respective totem pole transistors are biased at their base through resistors R16, R22 and R28 or, in other words, the NPN transistors Tr1, Tr3 and Tr5 in the transistor bridges $13_1$ to $13_3$ are turned ON while the PNP transistors Tr2, Tr4 and Tr6 are turned OFF.

Accompanying the above, the charge in the floating power sources $12_1$ to $12_3$ is applied to the gate of the respective upper side MOSFET's Tr16 to Tr18 to turn ON the MOSFET's. Thus, in contrast to the foregoing turning OFF of all of the lower side power MOSFET's Tr19 to Tr21, the upper side power MOSFET's Tr16 to Tr18 are all turned ON, the three phase bipolar coils $L_U$, $L_V$ and $L_W$ are short-circuited and, as will be appreciated, the motor is subjected to a rapid damping force.

In the driving circuit of the foregoing embodiment, more particularly, there are inserted resistors R1 and R2 between the Hall-effect elements $H_U$, $H_V$ and $H_W$ and power feed lines, and further resistors R3 to R8 between respective output terminals 1 to 6 of the distributor circuit 11 and the power feed lines. Biasing resistors R15, R21 and R27 are connected respectively to the base of the respective level conversion transistors Tr13, Tr14 and Tr15. Further biasing resistors R18, R24, R30, R20, R26 and R32 are connected respectively to the base of the respective transistor bridges $13_1$ to $13_6$, and collector resistors R17, R23, R29, R19, R25 and R31 are connected to the NPN transistors Tr1, Tr3, Tr5, Tr7, Tr9 and Tr11 of the respective transistor bridges $13_1$ to $13_6$. It is preferable to insert each of Zener diodes ZD1 to ZD6 between the gate and source of the respective power MOSFET's Tr16 to Tr21.

Figures 4, 4A:
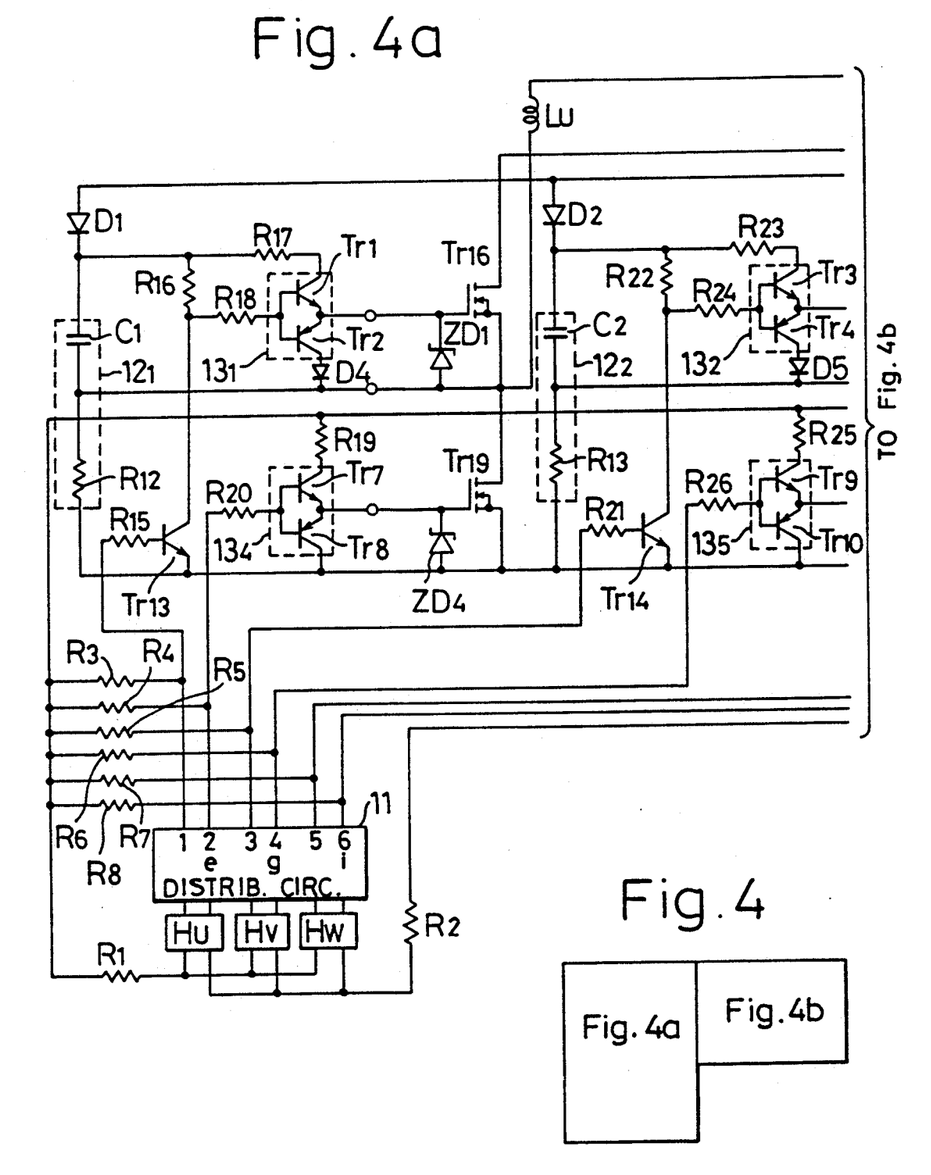
Figure 4B:
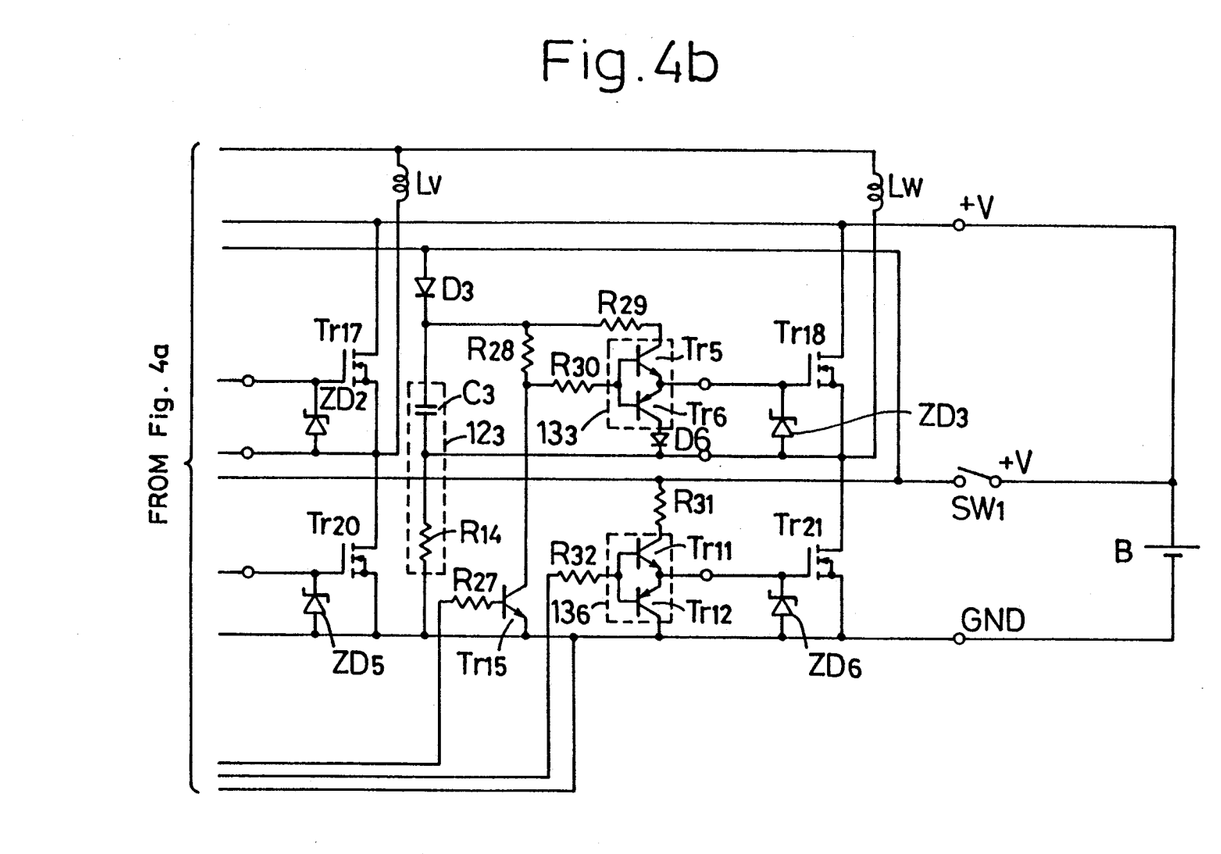

Referring to FIG. 4 depicts a second embodiment of the present invention, in which the same constituent elements as those in the embodiment of FIG. 1 are denoted by the same reference numerals as in FIG. 1. In the present embodiment, in particular, diodes D4 to D6 are inserted on the side of the collectors of the PNP transistors Tr2, Tr4 and Tr6 among the respective gate-driving totem pole transistors for the power MOSFET's Tr16 to Tr18. Referring here to the function of the diode D4 among these diodes D4 to D6 which corresponds in the phase to the transistors Tr1, Tr2, Tr7 and Tr8 and power MOSFET's Tr16 and Tr19, it is assumed now that the lower side power MOSFET Tr19 and the upper side power MOSFET Tr16 as well are turned OFF, then the PNP transistor Tr2 is turned ON while the gate of the power MOSFET Tr16 is grounded to the source. In this case, the transistor Tr13 which drives the base of the transistor Tr1 and of the transistor Tr2 as well is naturally turned ON, and the transistors Tr1 and Tr2 are grounded through the resistor R18 to the normal ground GND. Due to this, the potential of temporary ground to which the power MOSFET Tr16 and transistor Tr2 are connected is made higher than the normal ground GND. Consequently, there arises a risk that a current is caused to flow from the collector side of the PNP transistor Tr2 and the resistor R18 so as to be in reverse directional with respect to normal current flowing direction of the PNP transistor and thus to damage the transistor Tr2, but this damaging current can be effectively restrained by the diode D4. It will be appreciated that this function of the diode D4 is also applicable to the remaining diodes D5 and D6 which correspond to the remaining phases.

Figures 5, 5A:
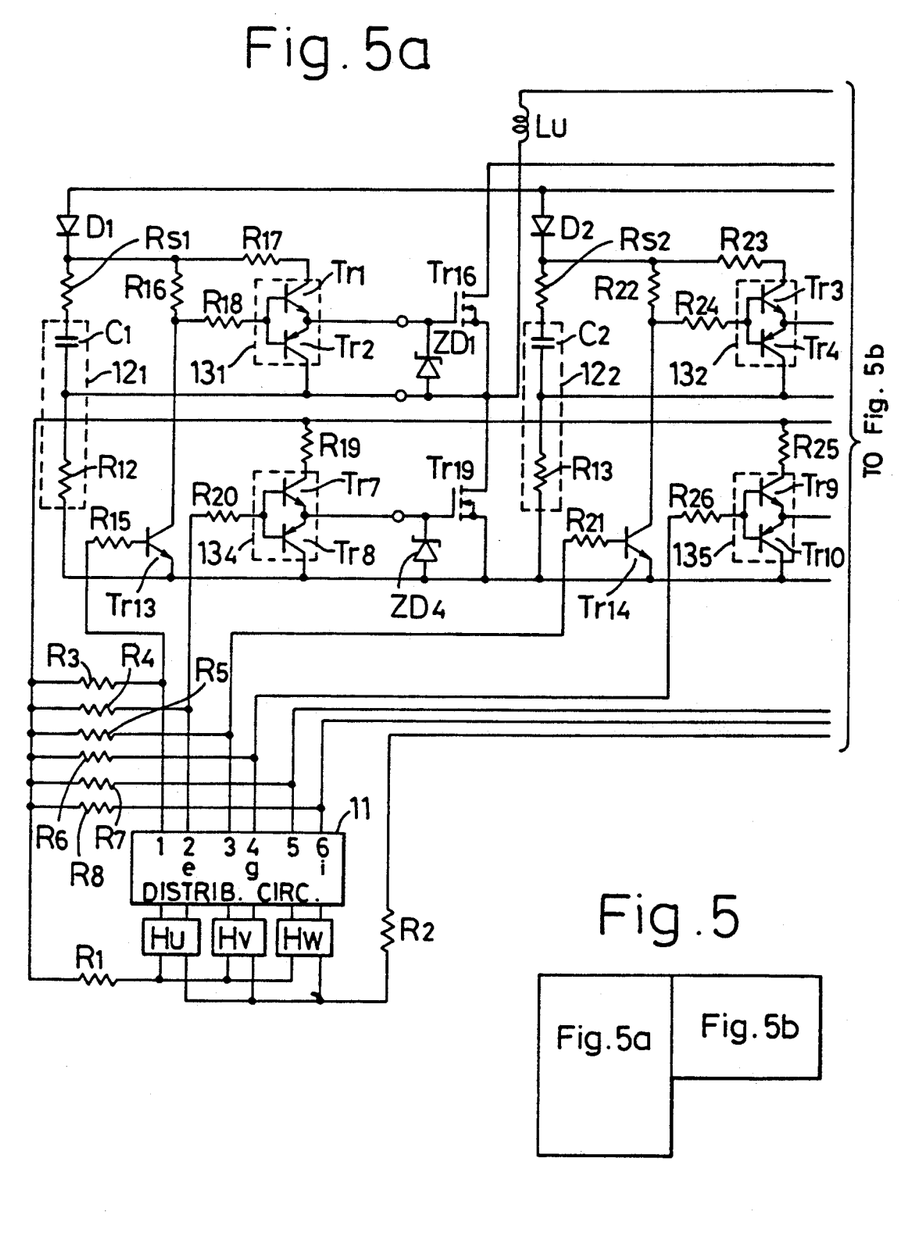
Figure 5B:
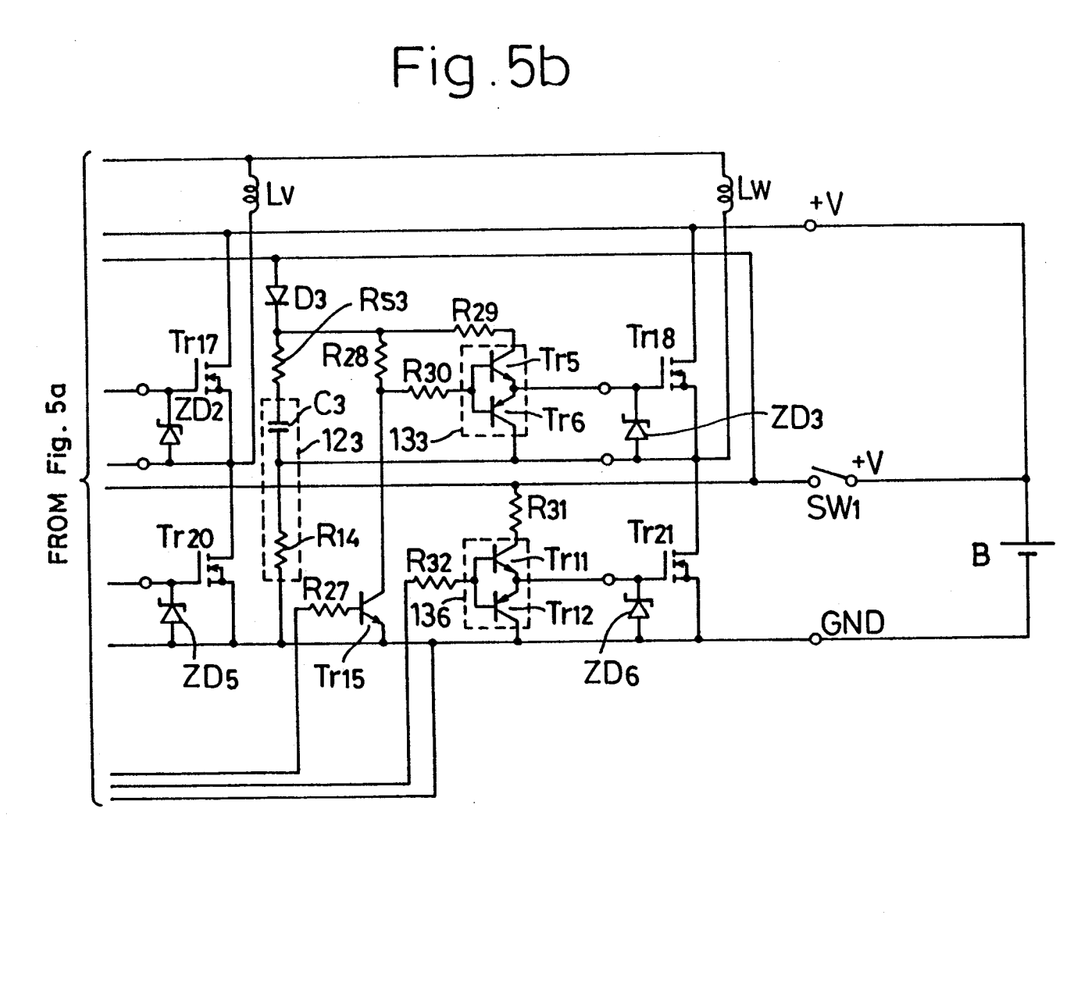
Figure 6:
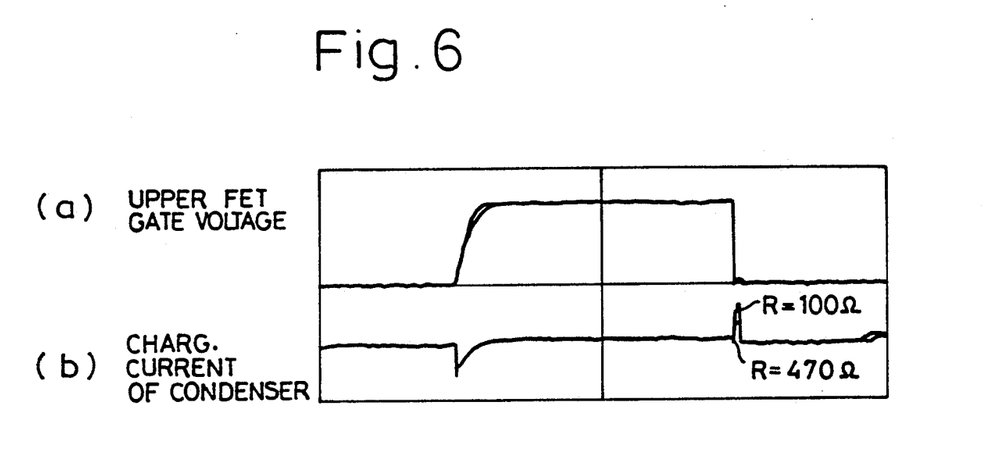
FIGS. 6 and 7 are wave-form diagrams for explaining the operation of the driving circuits shown in FIGS. 4 and 5.
Figure 7:
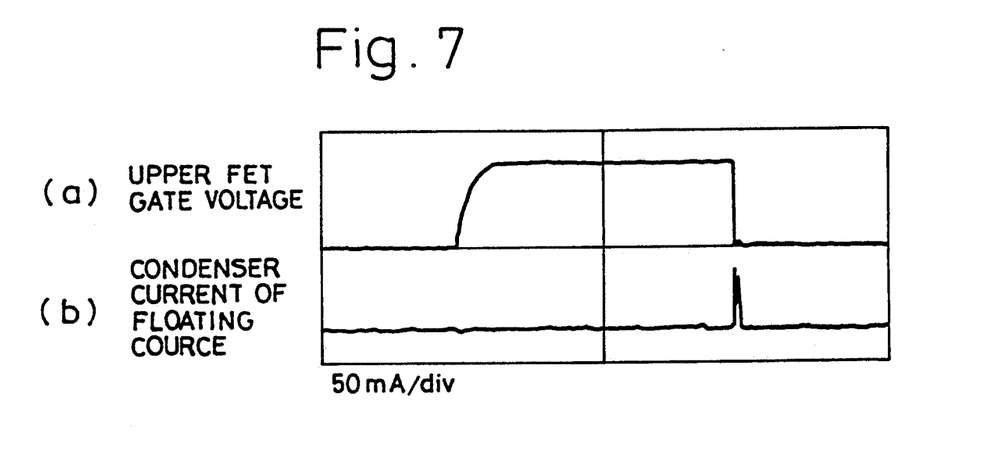

Referring to FIG. 5, there is shown a third embodiment of the present invention, in which the same constituent elements as those in FIG. 1 are denoted by the same reference numerals as in FIG. 1. In the present instance, limiting resistors Rs1 to Rs3 are respectively connected in series to each of the capacitors C1 to C3 in the floating power source $12_1$ to $12_3$, so that charging current to the capacitors C1 to C3 can be limited to be optimum by means of the limiting resistors Rs1 to Rs3. In this case, the charging current to the capacitors C1 to C3 can be restricted to be below the rated current by properly setting the resistance value of the limiting resistors Rs1 to Rs3, so that the capacitors C1 to C3 can be effectively prevented from being damaged. That is, in FIG. 6(a), there is shown a gate voltage of the upper side power MOSFET's Tr16 to Tr18 in the present embodiment, and further shown in FIG. 6(b) is a charging current of the capacitors C1 to C3 in the floating power sources $12_1$ to $12_3$ also in the present embodiment, whereas FIG. 7(b) shows the gate voltage of the upper side power MOSFET's Tr16 to Tr18 in the foregoing embodiment of FIG. 1 and FIG. 7(b) shows a charging current of the capacitors C1 to C3 also in the foregoing embodiment of FIG. 1. As will be clear when these drawings are compared with each other, the charging current of the capacitors C1 to C3 can be restricted more effectively in the present embodiment than in the case of FIG. 1. In FIG. 6(b), by the way, the charging current is shown as a result of measurement with the resistance value of the limiting resistors Rs1 to Rs3 set to be 100Ω and 470Ω.

Figures 8, 8A:
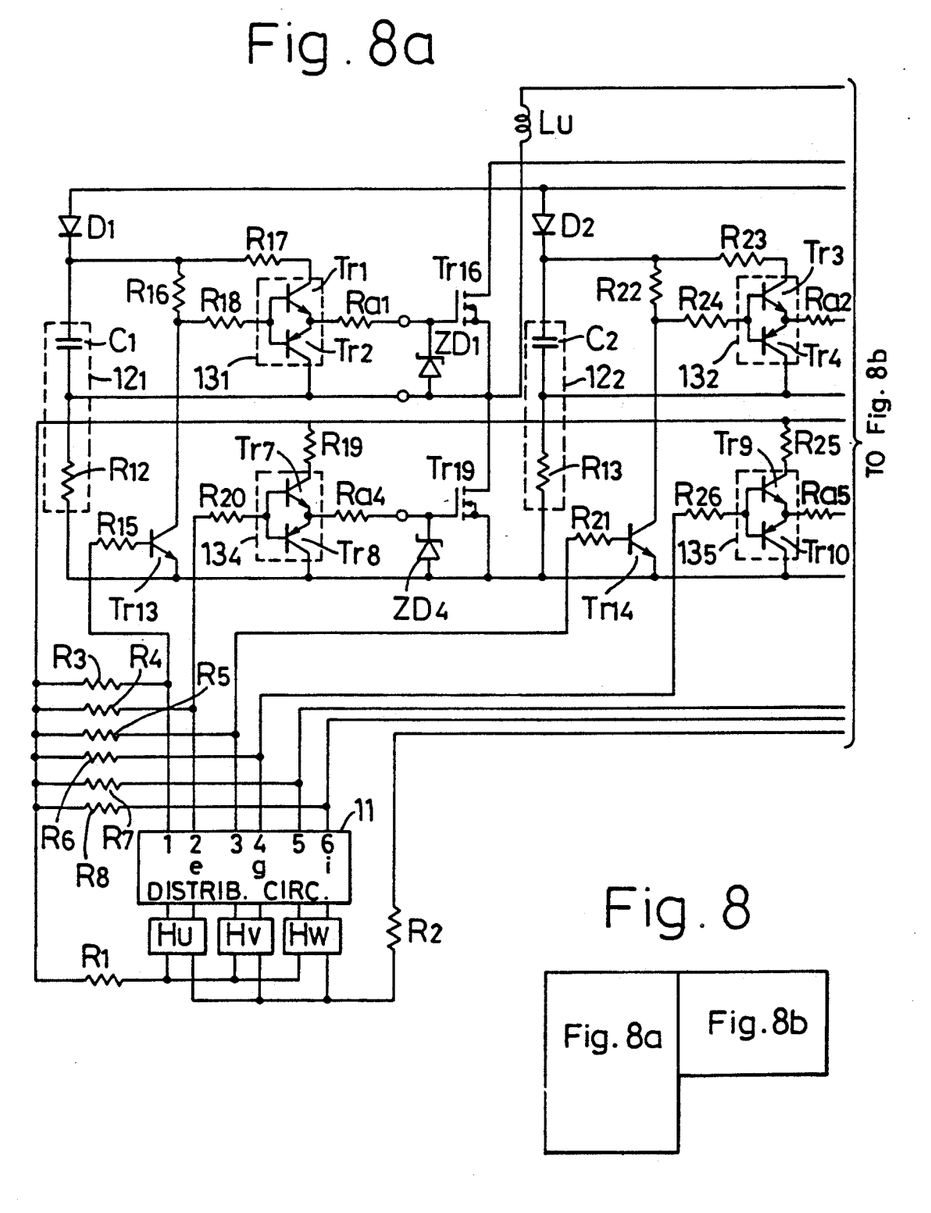
Figure 8B:
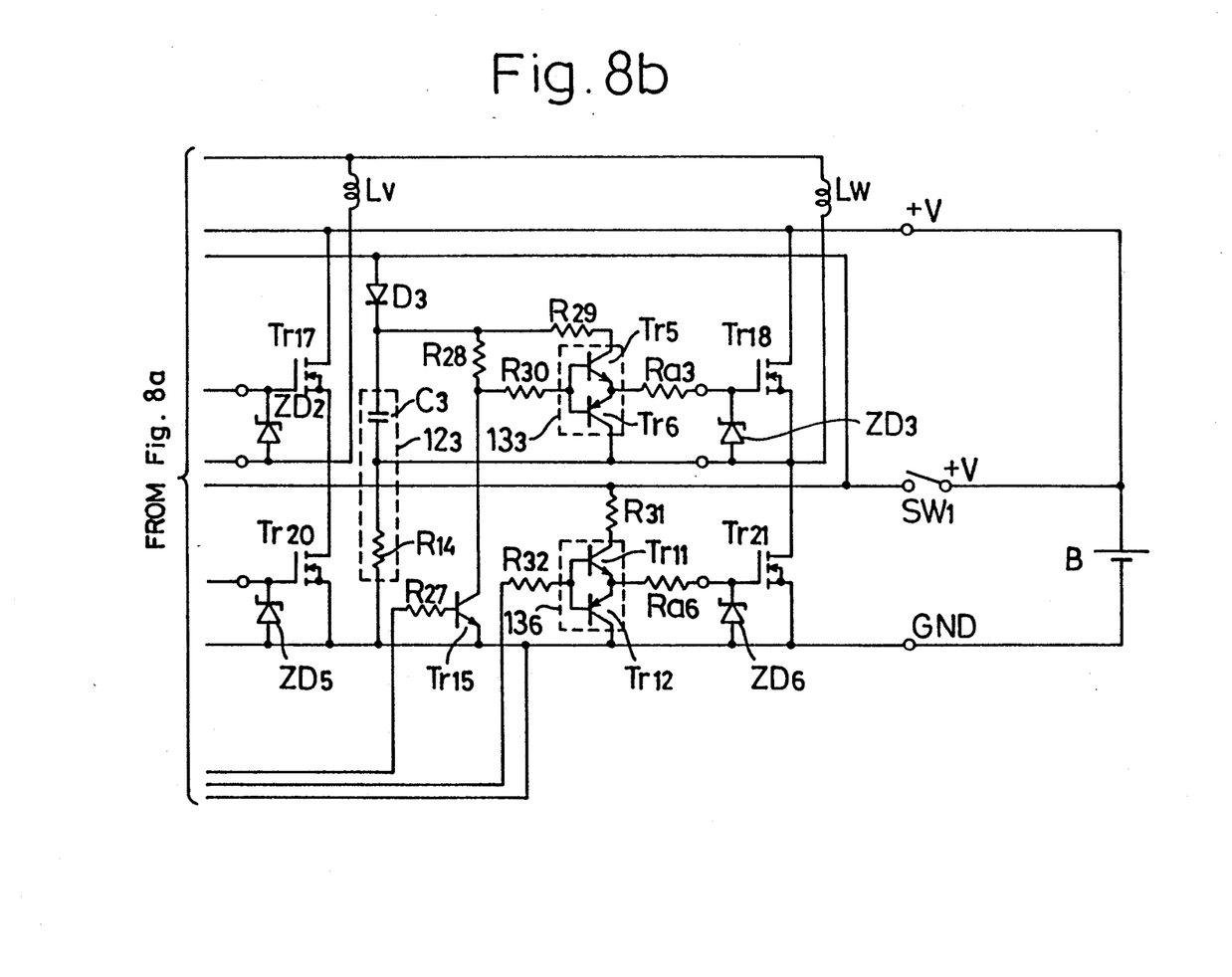
Figure 9:
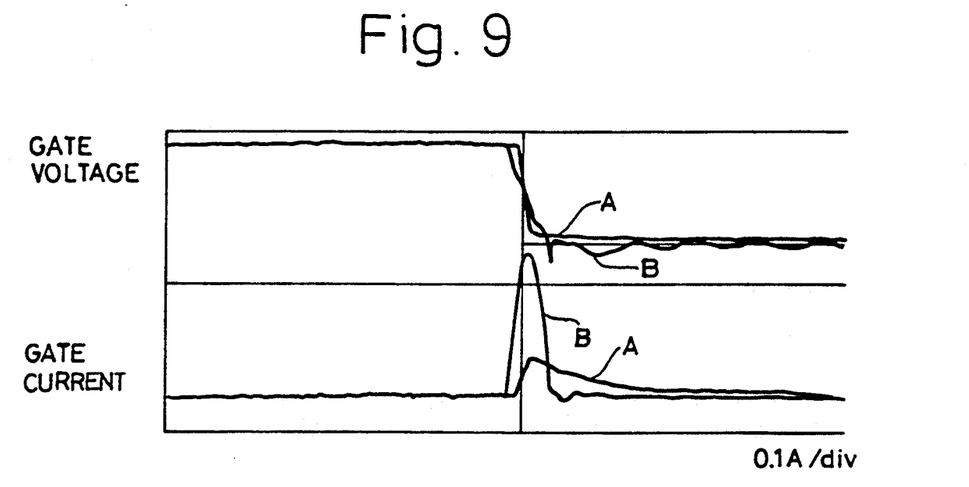
FIG. 9 is a wave-form diagram for explaining the operation of the driving circuit of FIG. 8.

Referring now to FIG. 8, there is shown a fourth embodiment of the present invention, in which the same constituent elements as in FIG. 1 are also denoted by the same reference numerals as in FIG. 1. In the present instance, there are inserted limiting resistors Ra1 to Ra6 respectively between the emitter of the respective transistors Tr2, Tr4, Tr6, Tr8, Tr10 and Tr12 in the transistor bridges $13_1$ to $13_6$ and the gate of the respective power MOSFET's Tr16 through Tr21, whereby the charging current generated upon turning off of the power MOSFET's Tr16 through Tr21 can be restrained by the limiting resistors Ra1 to Ra6 without directly entering into grounded state, and the PNP transistors Tr2, Tr4, Tr6, Tr8, Tr10 and Tr12 can be effectively prevented from being damaged. In FIG. 9, there are shown the gate voltages and gate currents of the power MOSFET's in the case of the present embodiment (denoted by curves "A") and also in the case of the foregoing embodiment of FIG. 1 (denoted by curves "B"), and it will be readily appreciated that the direct grounding of the charging current can be more effectively restrained in the present embodiment as will be clear when the curves in FIG. 9 are compared with one another.

What is claimed is:

1. A control system for driving brushless motors having three phase bipolar coils, comprising:
    a distributor circuit which receives three phase positional signals in electric $2\pi/3$ phase relationship from a position detector and generates a train of predetermined signals;
    a plurality of pairs of power MOSFET's forming upper side and lower side half-bridges;
    a first group of transistor bridges driving, at the gate, the lower side power MOSFET's of the half-bridges in response to the train of signals of said distributor circuit;
    a number of floating power sources each including a capacitor and a resistor, the resistor separating the capacitor from a ground terminal of the control system to render the charge of the capacitor in the floating power sources independent from the potential of the ground terminal;
    a second group of transistor bridges each making one of said respective floating power sources its own power source and driving, at the gate, the upper side power MOSFET's of the half-bridges in response to the train of signals of the distributor circuit;
    a control power source connected to said pairs of power MOSFET's; and
    means for damping the rotation of the motor by setting any one of the pairs of the upper side power MOSFET's and the lower side power MOSFET's which are connected to the three-phase bipolar coils of the brushless motor in a mutually reverse operating state by turning off the control power source and utilizing a residual charge in the capacitors of the floating power sources for setting the MOSFET's.

2. A control system according to claim 1 wherein said transistor bridges which are driving said upper side power MOSFET's comprise respectively a combination of an NPN transistor a PNP transistor and a diode connected to the collector side of the PNP transistor.

3. A control system according to claim 1 further comprising means connected to said capacitor of said floating power sources, for limiting the charge to the capacitor.

4. A control system according to claim 1 wherein said first and second groups of said transistor bridges comprise respectively a combination of NPN transistors and PNP transistors, and a limiting means is connected between the emitter of respective PNP transistors and the gate of a corresponding one of said power MOSFET's.

* * * * *